D. SPIREK.
DEVICE FOR TURNING EGGS.
APPLICATION FILED MAY 6, 1919.
1,308,686.
Patented July 1, 1919.
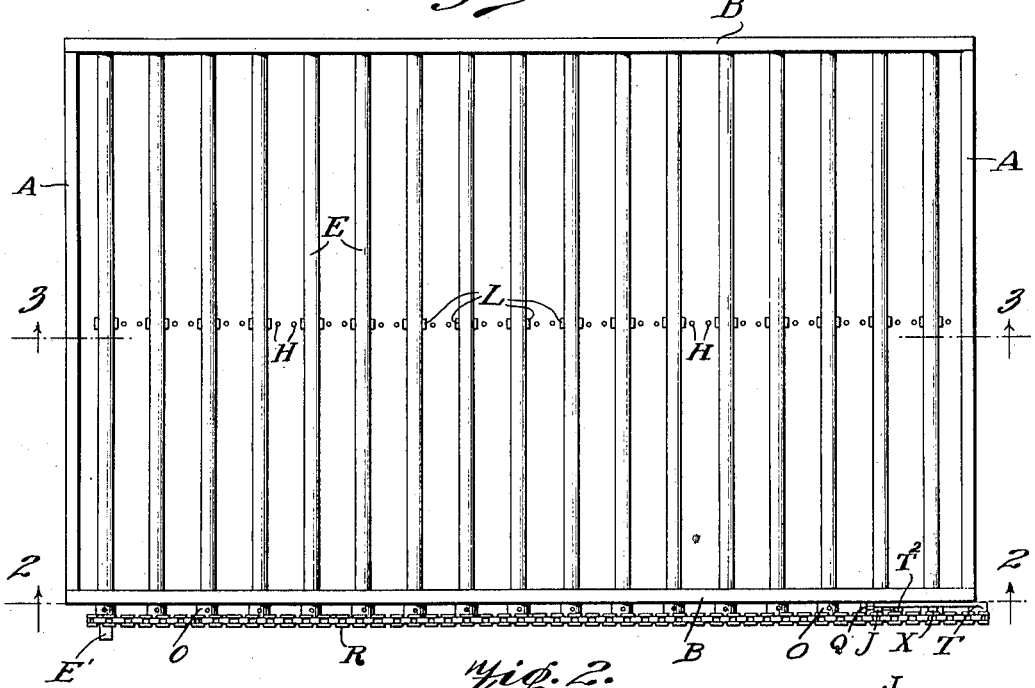
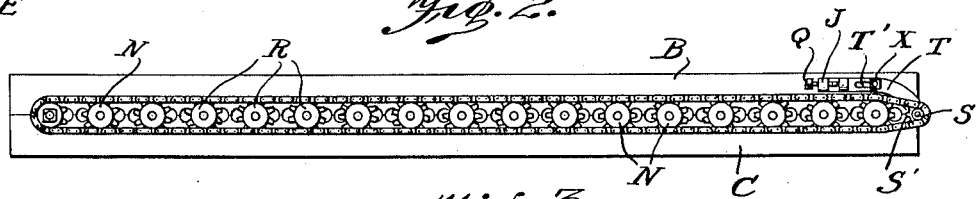
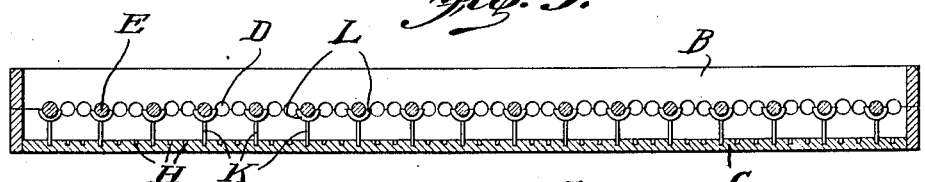
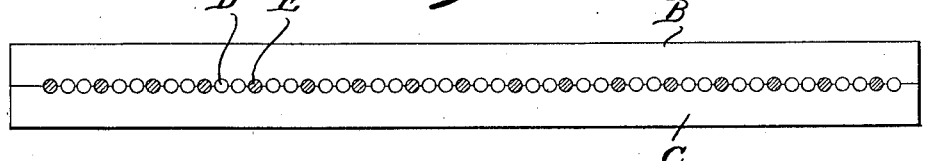
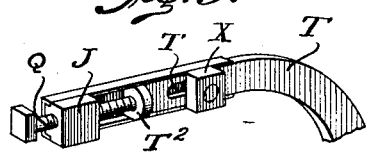
Inventor
David Spirek,
By Frank H. Hough
Attorney

UNITED STATES PATENT OFFICE.

DAVID SPIREK, OF FORT DODGE, IOWA.

DEVICE FOR TURNING EGGS.

1,308,686.   Specification of Letters Patent.   Patented July 1, 1919.

Application filed May 6, 1919. Serial No. 295,037.

*To all whom it may concern:*

Be it known that I, DAVID SPIREK, a citizen of the United States, residing at Fort Dodge, in the county of Webster and State of Iowa, have invented certain new and useful Improvements in Devices for Turning Eggs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in egg turning devices, and consists essentially in the provision of an apparatus of this nature so arranged that the turning rollers may be adjusted in different relative positions to one another and actuated by an adjustable sprocket chain and gear connection therewith.

The invention comprises various other details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a top plan view of the frame adapted to be positioned within a suitable casing, not shown.

Fig. 2 is a sectional view on line 2—2 of Fig. 1.

Fig. 3 is a sectional view on line 3—3 of Fig. 1.

Fig. 4 is a side view of the frame, and

Fig. 5 is an enlarged detail view of a hanger.

Reference now being had to the details of the drawings by letter:

A designates a rectangular outlined frame made of two complemental sections B and C, the adjacent lower edges of which are provided with oppositely disposed scalloped portions D forming bearings for rollers E. Midway between the opposite longitudinal sides of the frame and in the bottom thereof is formed a row of holes H, and K designates pins adapted to seat in said holes and provided with concaved bearing heads L adapted to form bearings for the central portions of the rollers. Sprocket wheels N are fastened to the corresponding ends of the rollers outside the frame, and each sprocket wheel has a collar O held by means of a set screw to the roller. A sprocket chain R passes about said sprocket wheels and forms means for driving the same in unison in the same direction. An adjustable hanger T has a slot T' therein, and in the outer end of said bracket member, which is curved, is mounted a pin S upon which a sprocket wheel S' is journaled and over which the sprocket chain passes. An adjusting screw Q is mounted in a threaded lug J fastened to the side of the frame, said screw bearing against an angled end $T^2$ and serves as a means for moving the hanger into adjusted positions, and X designates a bolt passing through said slot in the hanger and also the frame and serves to hold the hanger in an adjusted position.

The roller at the extreme left of the casing has a projecting angular outlined end E' over which a crank, provided with a central outlined socket, may be placed for the purpose of retaining the various rollers in unison with each other in the same direction.

In operation, when the parts are connected as shown, the eggs are placed upon the rollers which may be held in different adjusted positions through the mechanism described, adapting the same for different sized eggs. The sprocket wheel upon the roller at the extreme left is adapted to be held stationary while the hanger serves as a means for regulating the tension of the sprocket chain, the rollers being adapted to be held in any of the various bearings provided therefor.

By the provision of an apparatus shown means is provided for use in incubators where it is necessary in the successful operation of the same to cause the eggs to be turned in any suitable manner at intervals.

What I claim to be new is:

An egg turning device, comprising a frame made up of two complemental sections, the adjacent longitudinal edges of which are provided with oppositely disposed scalloped portions forming, when the frames are together, bearings, the bottom of the frame having a series of holes in alinement, pins seated in said holes and having concaved heads forming bearings for the rollers midway between the opposite sides of the frame, sprocket wheels keyed to the rollers, a sprocket chain passing about said wheels, and means for taking up slack in the chain, one of said rollers adapted to have a crank attached thereto for driving the chain.

In testimony whereof I hereunto affix my signature.

DAVID SPIREK.